(12) United States Patent
Lee et al.

(10) Patent No.: US 11,016,467 B2
(45) Date of Patent: May 25, 2021

(54) METHOD AND SYSTEM FOR SENSING FINE CHANGES IN PROCESSING/EQUIPMENT MEASUREMENT DATA

(71) Applicant: SK HOLDINGS CO., LTD., Seoul (KR)

(72) Inventors: Byung Min Lee, Cheonan-si (KR); Tae Young Hong, Seongnam-si (KR); Myung Seung Son, Seongnam-si (KR)

(73) Assignee: SK HOLDINGS CO., LTD., Seoul (KR)

( * ) Notice: Subject to any disclaimer, the term of this patent is extended or adjusted under 35 U.S.C. 154(b) by 32 days.

(21) Appl. No.: 16/328,778

(22) PCT Filed: Aug. 7, 2017

(86) PCT No.: PCT/KR2017/008501
§ 371 (c)(1),
(2) Date: Feb. 27, 2019

(87) PCT Pub. No.: WO2018/043936
PCT Pub. Date: Mar. 8, 2018

(65) Prior Publication Data
US 2019/0196445 A1 Jun. 27, 2019

(30) Foreign Application Priority Data
Aug. 30, 2016 (KR) .................. 10-2016-0110422

(51) Int. Cl.
*G05B 19/401* (2006.01)
*G05B 19/418* (2006.01)
(Continued)

(52) U.S. Cl.
CPC ....... *G05B 19/4015* (2013.01); *G05B 19/418* (2013.01); *G05B 19/41875* (2013.01);
(Continued)

(58) Field of Classification Search
CPC .............. G05B 19/4015; G05B 19/418; G05B 19/41875; G05B 2219/35261;
(Continued)

(56) References Cited

U.S. PATENT DOCUMENTS

| 2011/0161209 A1* | 6/2011 | Boyd | G06Q 10/0875 705/29 |
| 2013/0321425 A1* | 12/2013 | Greene | G06T 11/206 345/440 |
| 2014/0278234 A1* | 9/2014 | Chang | G06F 17/18 702/179 |

FOREIGN PATENT DOCUMENTS

| JP | 2000-29513 A | 1/2000 |
| JP | 2011-060012 A | 3/2011 |

(Continued)

OTHER PUBLICATIONS

Office Action for corresponding KR 10-2016-0110422, dated May 22, 2017.

(Continued)

*Primary Examiner* — Ziaul Karim
(74) *Attorney, Agent, or Firm* — Sughrue Mion, PLLC

(57) ABSTRACT

A method and a system for sensing fine changes in processing/equipment measurement data are provided. A data change sensing method according to an embodiment of the present invention extracts a part on the basis of a statistical distribution of reference data and comparison data, calculates a target range on the basis of a specification, and discriminates data, included in the target range, among the extracted reference data and comparison data so as to determine data changes. Therefore, fine changes in measurement data for processing or equipment can be sensed in a manufacturing process, thereby enabling pre-estimation of (Continued)

potential quality variability of products and quick preemptive actions for preventing quality degradation.

15 Claims, 7 Drawing Sheets

(51) Int. Cl.
    *G06Q 50/04*         (2012.01)
    *G06Q 10/06*         (2012.01)
    *G06F 17/15*         (2006.01)
    *G06F 17/18*         (2006.01)

(52) U.S. Cl.
    CPC .............. *G06F 17/15* (2013.01); *G06F 17/18* (2013.01); *G06Q 10/0639* (2013.01); *G06Q 50/04* (2013.01); *G05B 2219/35261* (2013.01); *Y02P 90/02* (2015.11); *Y02P 90/30* (2015.11)

(58) Field of Classification Search
    CPC ......... G05B 2219/32191; G06Q 50/04; G06Q 10/0639; G06Q 10/06395; G06F 17/15; G06F 17/18; Y02P 90/02; Y02P 90/30
    See application file for complete search history.

(56) References Cited

FOREIGN PATENT DOCUMENTS

| | | | | |
|---|---|---|---|---|
| JP | 2011060012 A | * | 3/2011 | |
| JP | 2016-71454 A | | 5/2016 | |
| KR | 10-2014-0113153 A | | 9/2014 | |
| KR | 20140113153 A | * | 9/2014 | ............. G06F 17/18 |

OTHER PUBLICATIONS

International Search Report for PCT/KR2017/008501, dated Oct. 25, 2017.
Communication dated Feb. 25, 2020, issued by the Japanese Patent Office in counterpart Japanese Patent Application No. 2019-505448.

\* cited by examiner

METHOD AND SYSTEM FOR SENSING FINE CHANGES IN PROCESSING/EQUIPMENT MEASUREMENT DATA

TECHNICAL FIELD

The present disclosure relates to technology for sensing a change in data, and more particularly, to a method and a system for sensing a change in measurement data regarding a process or equipment in a manufacturing process.

BACKGROUND ART

To achieve consistent quality of produced products, there is a need to sense a change in measurement data regarding a process/equipment. If a subtle change is sensed, quality variability can be minimized or enhanced by taking initial measures more rapidly.

However, current sensing techniques are inadequate to sense a subtle change. For example, a statistical process control technique typically performed in a manufacturing site is limited to sensing a short-term downward or upward trend according to deviation of data and a defined rule, and there is a limit to identifying or sensing a subtle change between pre-measurement data and post-measurement data.

Therefore, there is a need for a method for sensing a subtle change in measurement data regarding a process or equipment.

DISCLOSURE

Technical Problem

The present disclosure has been developed in order to address the above-discussed deficiencies of the prior art, and an object of the present disclosure is to provide, as a method for a preemptive measure to minimize quality variability of a product, a method and a system for sensing a subtle change in measurement data regarding a process or equipment in a manufacturing process.

Technical Solution

According to an embodiment of the present disclosure to achieve the above-described object, a method for sensing a change in data includes: a step of extracting a part of data, based on statistical distributions of reference data and comparison data; a step of calculating a target range based on a specification; and a first determination step of identifying data included in the target range from among the extracted reference data and comparison data, and determining a change in data.

In addition, the step of calculating may include a step of calculating the target range according to following mathematical equations:

Target Range=|upper specification limit (USL)-lower specification limit (LSL)|*$w1$ TUL (target upper limit)=Target+$w2$*|USL−LSL|

TLL (target lower limit)=Target−$w2$*|USL−LSL| where Target is a target value of the specification, and $w1$ and $w2$ are weight values.

In addition, the step of extracting may include a step of extracting reference data and comparison data included in a set CI.

In addition, the first determination step may include a step of, when there is a significant difference between a first inclusion ratio of the reference data included in the target range, and a second inclusion ratio of the comparison data included in the target range, determining the change in data.

In addition, the first determination step may include: a step of, when the second inclusion ratio is smaller than the first inclusion ratio, determining that the change in data is caused by quality degradation; and a step of, when the second inclusion ratio is larger than the first inclusion ratio, determining that the change in data is caused by quality enhancement.

According to an embodiment of the present disclosure, the method may further include: a first test step of testing a significant difference between a distribution of the reference data and a distribution of the comparison data; a second test step of testing a change in representative values of the reference data and the comparison data; a second determination step of determining a change in data, based on a result of the testing in the first test step and a result of the testing in the first test step; and a step of finally determining the change in data, based on the result of the determining in the first determination step and a result of the determining in the second determination step.

In addition, the second test step may include: a step of, when it is tested that there is the significant difference in the distribution in the first test step, testing the change in the representative value according to a first test technique; and a step of, when it is tested that there is no significant difference in the distribution in the first test step, testing a significant difference in the representative value according to a second test technique.

The second determination step may include: a step of, when a second absolute difference is larger than a first absolute difference, determining that the change in data is caused by quality degradation, the second absolute difference being "an absolute difference between a representative value of the comparison data and a target value of the specification," the first absolute difference being "an absolute difference between a representative value of the reference data and the target value of the specification"; and a step of, when the second absolute difference is smaller than the first absolute difference, determining that the change in data is caused by quality enhancement.

According to an embodiment of the present disclosure, the method may further include: a step of setting a data change analysis type; a step of calculating a process ability index for each change analysis type, by using measurement data including the reference data and the comparison data; and a third determination step of determining the change in data, based on a size of the calculated process ability index, and the step of determining may include a step of finally determining the change in data, based on the result of the determining in the first determination step, the result of the determining in the second determination step, and a result of the determining in the third determination step.

In addition, the data change analysis type may include at least one of a comparison analysis type of the reference data and the comparison data regarding the process, a comparison analysis type of the reference data and the comparison data regarding the equipment, an inter-equipment measurement data comparison analysis type, and a measurement data comparison analysis type between best performance equipment and other equipment.

In addition, the step of calculating may include a step of further calculating the process ability index according to each specification type, and the specification type may include at least one of a larger the better characteristics specification, a smaller the better characteristics specification, and a nominal the best characteristics specification.

In addition, the reference data may be measurement data of a first temporal section, and the comparison data may be measurement data of a second temporal section. The first temporal section may precede the second temporal section.

In addition, the first temporal section may be longer than the second temporal section.

The reference data and the comparison data may be data from which an outlier is removed, and a range of the outlier may vary according to a number of reference data and a number of comparison data.

In addition, the outlier may be data which is less than a lower limit (LL), or exceeds an upper limit (UL), the LL and the UL being defined by following equations:

$$LL=Q2-K*(Q3-Q1)$$

$$UL=Q2+K*(Q3-Q1)$$

where $Q1$, $Q2$, $Q3$ are data satisfying '$Q3>Q2>Q1$,' $K=(a*n-b)/(c*n-d)$, a, b, c, d are constants, and n is a number of reference data and comparison data.

According to another embodiment of the present disclosure, a system for sensing a change in data includes: a collector configured to collect reference data and comparison data; and a processor configured to extract a part of data, based on statistical distributions of the reference data and the comparison data collected by the collector, to calculate a target range based on a specification, and to identify data included in the target range from among the extracted reference data and comparison data, and to determine a change in data.

Advantageous Effects

According to embodiments of the present disclosure as described above, a subtle change in measurement data regarding a process or equipment can be sensed in a manufacturing process, and thus potential quality variability of products can be pre-estimated, and quick preemptive actions for preventing quality degradation can be enabled.

In addition, according to embodiments of the present disclosure, occurrence of a subtle change can be sensed exactly/rapidly based on various and complex factors, by using a process ability index of each analysis type, a distribution and a median value of measurement data, a correspondence between measurement data and a target value, or etc.

BEST MODE

Hereinafter, the present disclosure will be described in more detail with reference to the drawings.

Embodiments of the present disclosure suggest a method for sensing a subtle change in a process/equipment. "The subtle change in the process/equipment" refers to a subtle change in measurement data regarding a process or equipment, measured after the process in a manufacturing process.

Sensing the subtle change in the process/equipment functions as a precondition for preemptive measures to minimize quality variability of a product produced by automated equipment, and a decreasing yield.

To achieve this, the method for sensing the subtle change in the process/equipment, suggested in embodiments of the present disclosure, senses occurrence of a subtle change exactly/rapidly based on various and complex factors, by using a process ability index of each analysis type, a distribution and a median value of measurement data, a correspondence between measurement data and a target value, or etc.

Figure 1:
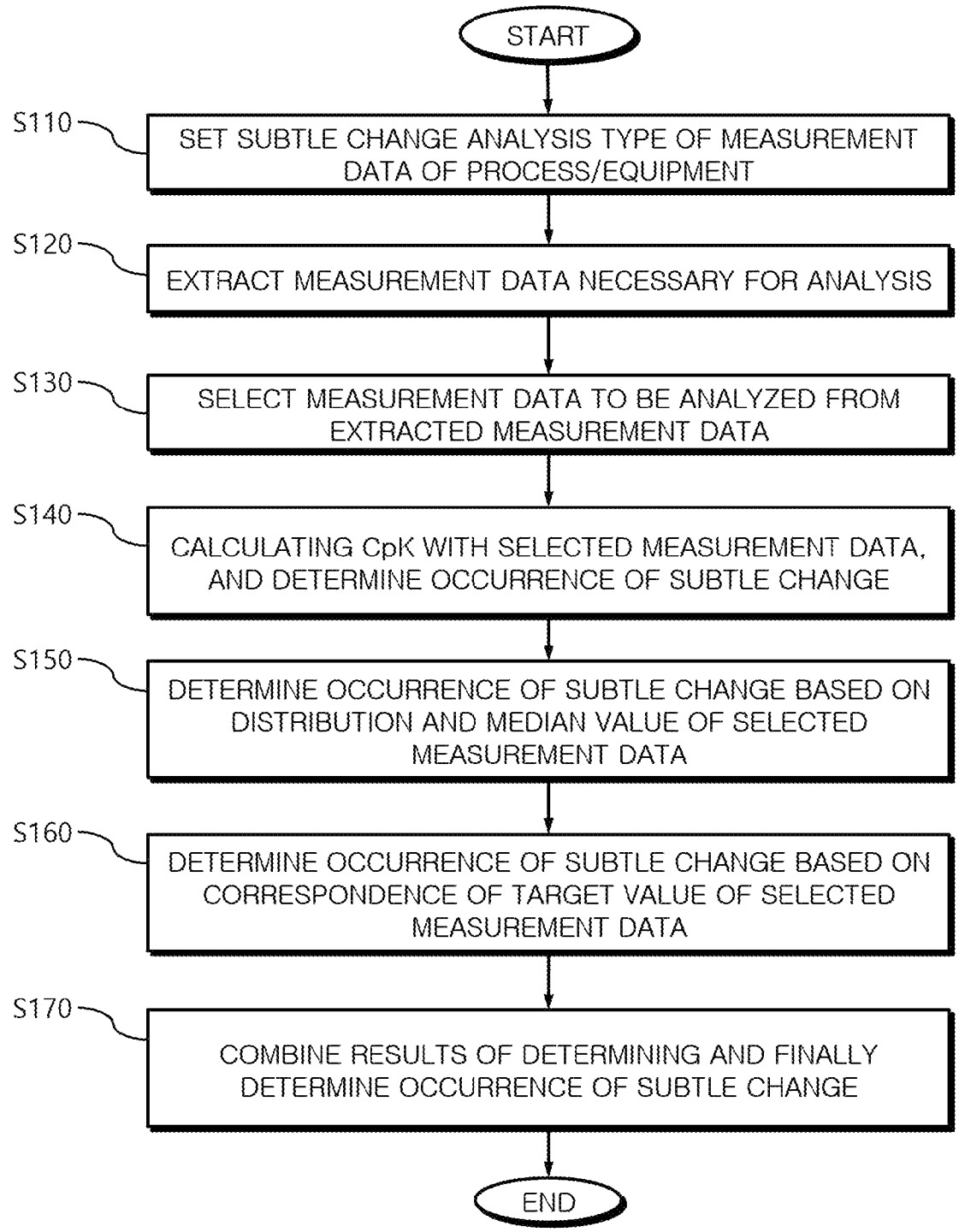
FIG. 1 is a flowchart provided to explain a method for sensing a subtle change in a process/equipment according to an embodiment of the present disclosure.

FIG. 1 is a flowchart provided to explain a method for sensing a subtle change in a process/equipment according to an embodiment of the present disclosure. The illustrated method is performed by a "system for sensing a subtle change in a process/equipment" (hereinafter, referred to as a "subtle change sensing system"), which is a kind of a computing system.

As shown in FIG. 1, the subtle change sensing system sets a subtle change analysis type of measurement data regarding the process/equipment (S110). The subtle change analysis type may be manually set according to an input of an administrator, or may be automatically set according to characteristics of the process/equipment.

The subtle change analysis type is divided into 1) a pre/post-change analysis and 2) a comparison analysis.

The pre/post-change analysis is an analysis of a type that senses a subtle change by comparing past measurement data (pre-data) and current measurement data (post-data). The 1) pre/post-change analysis is divided into 11) a process pre/post-change analysis for analyzing a pre/post-change with reference to the process, and 12) an equipment pre/post-change analysis for analyzing a pre/post-change with reference to the equipment.

Figure 2:
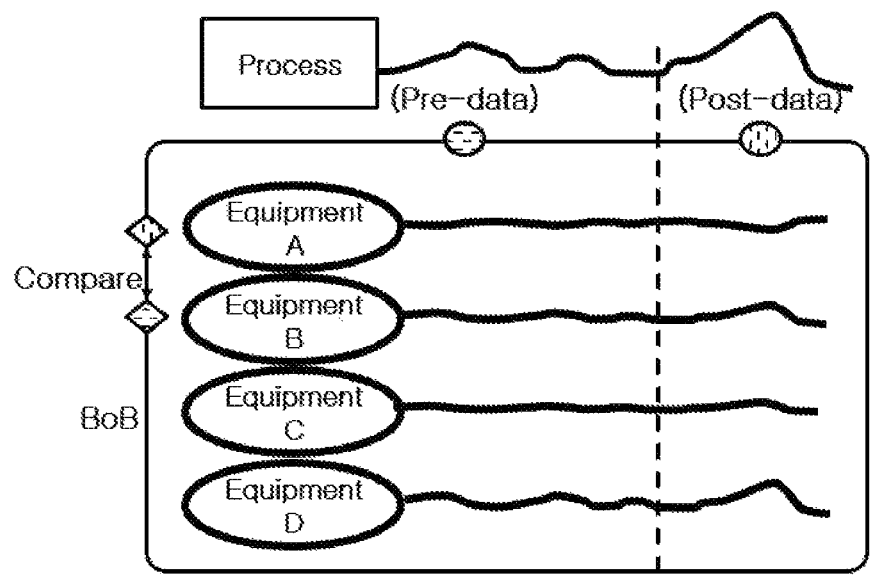
FIG. 2 is a view provided to explain concepts of pre/post-change analysis and comparison analysis.

FIG. 2 illustrates the concept of the process pre/pro-change analysis on the upper portion, and illustrates the concept of the equipment pre/post-change analysis regarding equipment A, equipment B, equipment C, and equipment D. With reference to the dashed line, a comparison analysis is performed with respect to the past measurement data (pre-data) on the left portion and the current measurement data (post-data) on the right portion.

The 2) comparison analysis is divided into 21) an inter-equipment comparison analysis and 22) a best of breed (BoB) comparison analysis.

The inter-equipment comparison analysis is an analysis of a type which compares measurement data between pieces of equipment, for example, measurement data of equipment A and measurement data of equipment B as shown in FIG. 2.

The BoB analysis is an analysis of a type which compares measurement data of equipment realizing the best performance among the same kinds of pieces of equipment used in the same process, and measurement data of the other pieces of equipment. For example, the BoB analysis compares "measurement data of equipment C corresponding to BOB" and measurement data of equipment A, equipment B, and equipment D, respectively, as shown in FIG. 2.

After setting the subtle change analysis type, the subtle change sensing system extracts measurement data necessary for the analysis (S120). The measurement data is measurement data regarding the process/equipment necessary for the analysis of the type set in step S110.

As described above in FIG. 2, the measurement data may be divided into past measurement data (pre-data) and current measurement data (post-data). The "past measurement data (pre-data)" may be a reference for sensing a subtle change of the current measurement data (post-data), and thus will be referred to as "reference data." In addition, since "the current measurement data (post-data)" is an object to be compared with the past measurement data (pre-data), the current measurement data will be referred to as "comparison data."

Figure 3:
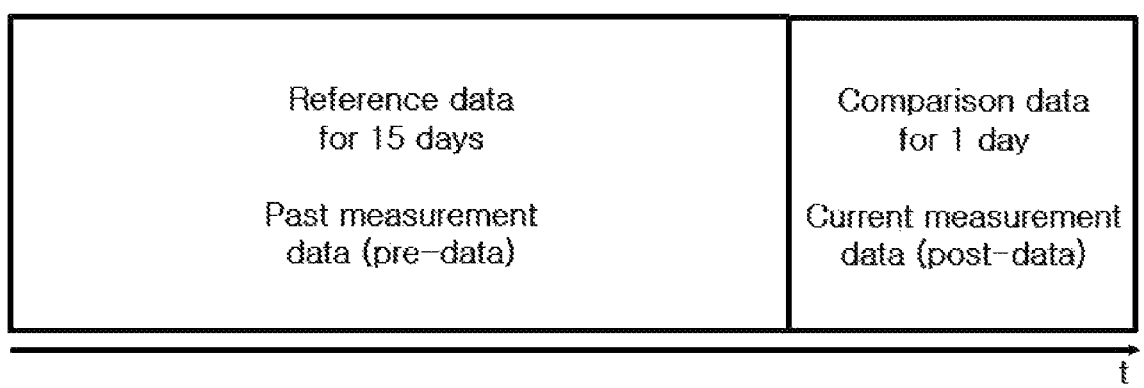
FIG. 3 is a view provided to explain concepts of reference data and comparison data.

It is assumed that the reference data is good measurement data without a change including a subtle change, and the reference data is required to be measurement data accumulated for a longer time than the comparison data. For example, the reference data may be set to measurement data accumulated for 15 days, and the comparison data may be set to measurement data of 1 day, as shown in FIG. 3.

After extracting the measurement data, the subtle change sensing system selects only measurement data to be analyzed among the extracted measurement data (S130).

Specifically, measurement data that does not satisfy a parameter for analysis may be excluded. For example, when the number of reference data is less than 30 or the number of comparison data is less than 5, the measurement data is excluded from the analysis object.

In addition, in the case of the pre/post-change analysis, measurement data that does not define a target, an upper specification limit (USL), a lower specification limit (LSL) of the process/equipment in the specification is excluded from the analysis object. In addition, in the case of the comparison analysis, measurement data which has a change in the specification during an analysis term is excluded from the analysis object.

Furthermore, measurement data corresponding to an outlier is removed. The outlier is measurement data which is less than a lower limit (LL) or exceeds an upper limit (UL). In other words, measurement data greater than or equal to the LL or less than or equal to the LL has a normal value. The LL and the UL are defined by the following equations.

$$LL = Q2 - K^*(Q3 - Q1)$$

$$UL = Q2 + K^*(Q3 - Q1)$$

$$K = (a^*n - b)/(c^*n - d)$$

where $Q1$, $Q2$, $Q3$ are the first quartile, the second quartile, and the third quartile, respectively, $a$, $b$, $c$, $d$ ($a>c$) are constants, and $n$ is the number of measurement data.

When the total measurement data is listed from the smallest to the largest, data corresponding to 25%, 50%, and 75% are the first quartile, the second quartile, and the third quartile, respectively. In other words, data corresponding to upper rankings 75%, 50%, and 25% in size among the total measurement data may be the third quartile, the second quartile, and the first quartile, respectively. Accordingly, a relationship "Q3>Q2>Q1" is established.

As described above, a range of the outlier or a range of a normal value defined by the LL and the UL varies according to the number of measurement data extracted in step S120. Specifically, since a>c, as the number of measurement data increases, the range of the normal value increases (proportional relationship), whereas the range of the outlier decreases (inversely proportional relationship).

Next, the subtle change sensing system calculates CpK, which is one of the process ability indexes, according to each subtle change analysis type, by using the measurement data selected in step S130, and determines whether a subtle change occurs, based on the size of the calculated CpK (S140).

In other words, when CpK exceeds a threshold value, it may be determined that a subtle change occurs in the measurement data of the process/equipment.

In calculating CpK in step S140, all of the reference data and the comparison data are used. In addition, it should be noted that calculating CpK in step S140 is performed according to each subtle change analysis type set in step S110.

Furthermore, calculating CpK in step S140 may be performed according to a specification type. That is, calculating CpK may be performed according to a larger the better characteristics specification, a smaller the Better characteristics specification, a nominal the best characteristics specification.

The subtle change sensing system determines whether a subtle change occurs, based on a distribution and a median value of the measurement data selected in step S130 (S150). A detailed flowchart regarding step S150 is illustrated in FIG. 4.

Figure 4:
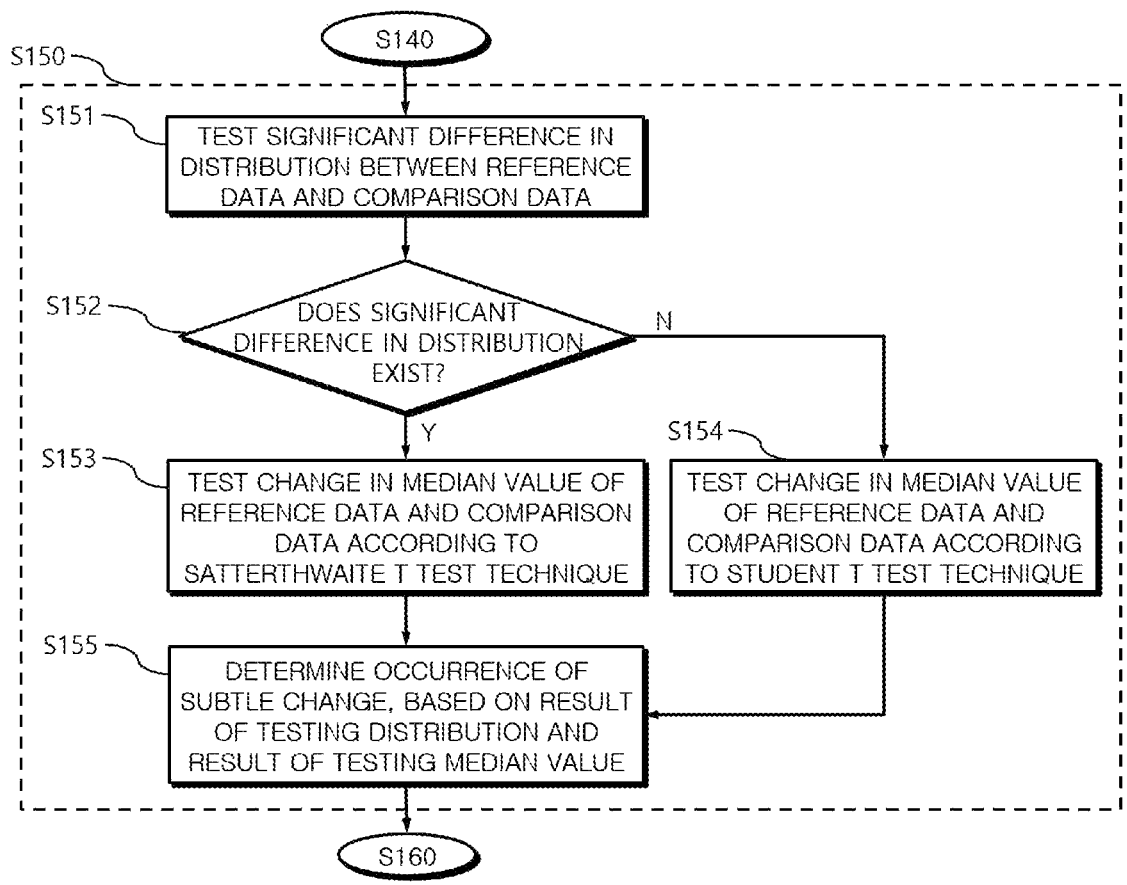
FIG. 4 is a detailed flowchart of a method for determining a subtle change based on a distribution/median value of measurement data.
Figure 5:
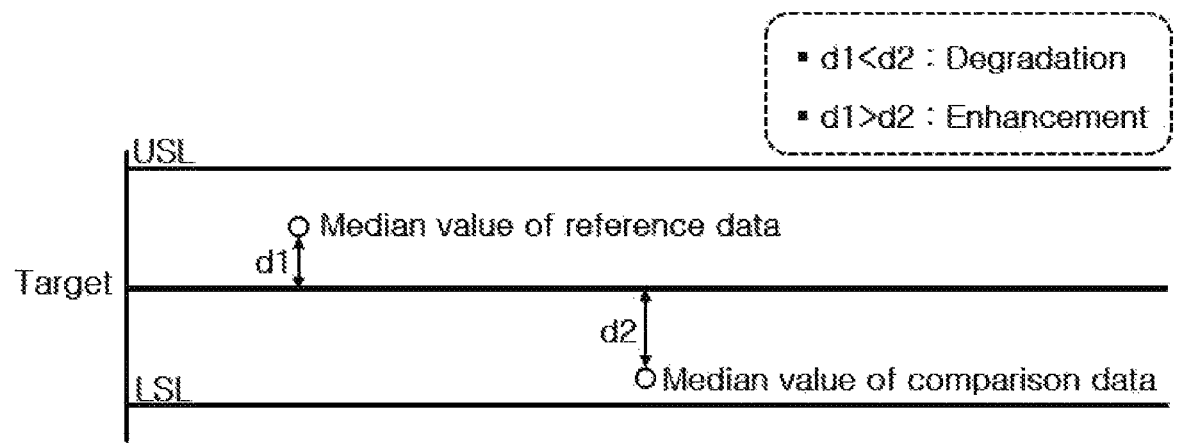
FIG. 5 is a view provided to explain a factor/interpretation of a change in the median value.

As shown in FIG. 4, to determine a subtle change based on the distribution/median value, the subtle change sensing system tests a significant difference between a distribution of the reference data and a distribution of the comparison data (S151). The distribution test (test for equal variance) may be performed by the Levene test, and other testing techniques may be applied.

Next, the subtle change sensing system tests whether there is a change in the median value between the reference data and the comparison data. In this step, the testing technique varies according whether there is a significant difference in the distribution between the reference data and the comparison data.

Specifically, when it is tested that there is a significant difference in the distribution in step S151 (S152-Y), the subtle change sensing system tests whether there is a change in the median value between the reference data and the comparison data according to the Satterthwaite T test technique (S153).

On the other hand, when it is tested that there is no significant difference in the distribution in step S151 (S152-N), the subtle change sensing system tests whether there is a change in the median value between the reference data and the comparison data according to the Student T test technique (S154).

Next, the subtle change sensing system determines whether a subtle change occurs, based on the result of testing the significant difference in the distribution in step S151, and the result of testing the median value in step S153/S154 (S155).

Step S155 of determining the occurrence of a subtle change may be implemented differently according to characteristics of the process/equipment. For example, it may be determined that a subtle change occurs when there is a significant difference in the distribution and simultaneously there is a change in the median value, and also, it may be determined that a subtle change occurs when any one of the case where there is a significant difference in the distribution and the case where there is a change in the median value is satisfied.

The change in the median value may be caused by enhancement rather than degradation of product quality. Accordingly, when d2 (an absolute difference between a median value of the comparison data and a target value) is larger than d1 (an absolute difference between a median value of the reference data and a target value), the subtle change may correspond to degradation of the product quality, and, when d2 is smaller than d1, the subtle change may correspond to enhancement of the product quality.

Thereafter, the subtle change sensing system determines whether a subtle change occurs, based on a correspondence between the measurement data selected in step S130 and the target value (S160). A detailed flowchart of step S160 is illustrated in FIG. 6.

Figure 6:
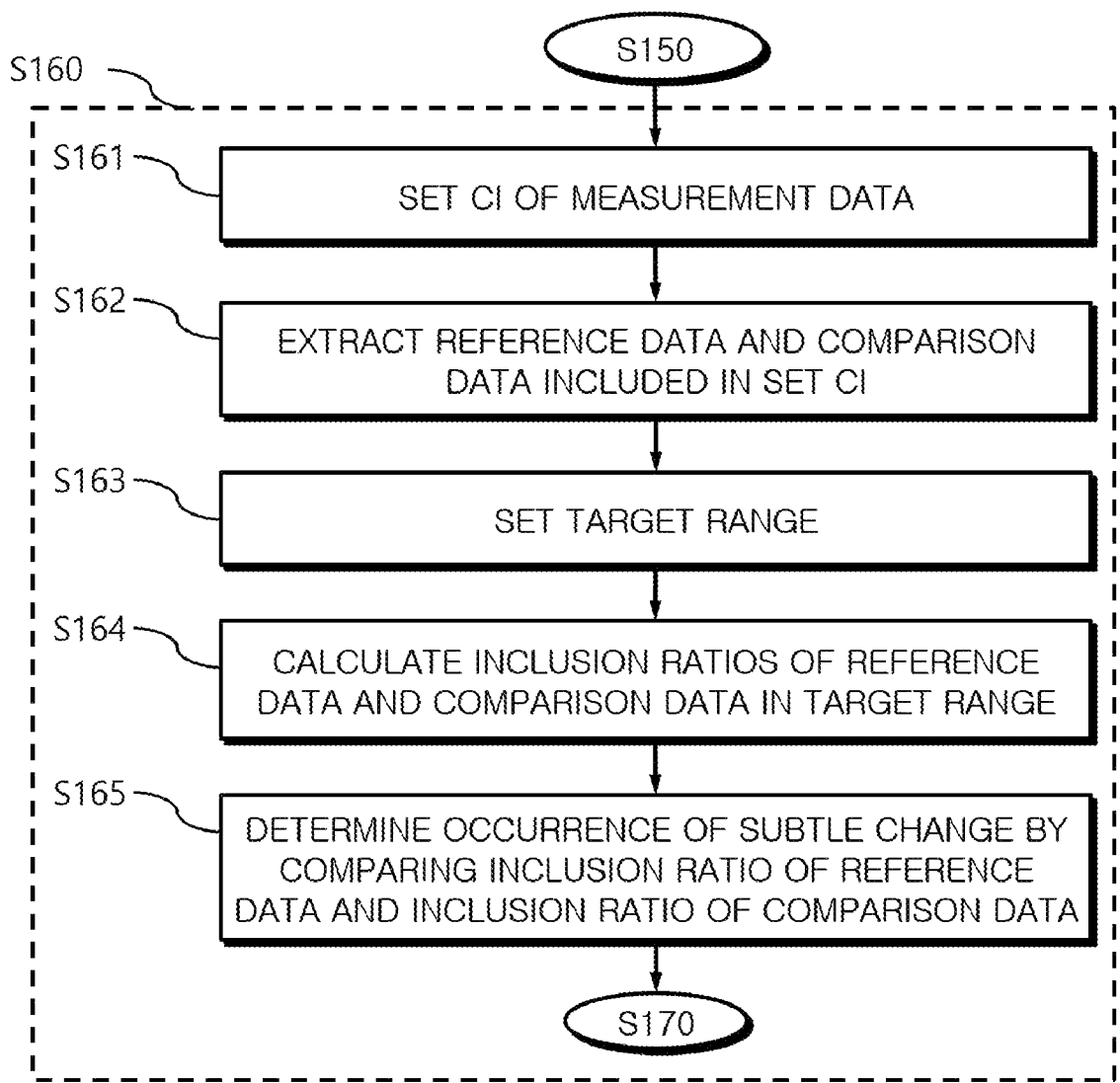
FIG. 6 is a detailed flowchart of a process of determining a subtle change based on a correspondence between measurement data and a target value.

As shown in FIG. 6, to determine a subtle change based on the target value, the subtle change sensing system sets a confidence interval (CI) of the measurement data (S161). Herein, the subtle change sensing system may set a CI of 99%, a CI of 95%, a CI of 90% according to characteristics of the process/equipment.

Next, the subtle change sensing system extracts reference data and comparison data included in the CI set in step S161 (S162). In step S162, measurement data falling out of the CI is removed. Step S162 corresponds to a step of extracting a part of the data, based on statistical characteristics of the measurement data.

Thereafter, the subtle change sensing system specifies a target range (S163). The target range is a range which is set by a target upper limit (TUL) and a target lower limit (TLL) determined by the following equations.

Target Range=|USL−LSL|*25%

TUL=Target (target value)+12.5%*|USL−LSL|

TLL=Target−12.5%*|USL−LSL|

Next, the subtle change sensing system calculates ratios of the reference data and the comparison data, extracted in step S162, included in the target range calculated in step S163 (S164), and determines whether a subtle change occurs by comparing the calculated inclusion ratio (t1) of the reference data, and the calculated inclusion ratio (t2) of the comparison data (S165).

When there is a significant difference between the inclusion ratios in step S165, it may be determined that a subtle change occurs. The significant difference may be caused by enhancement rather than degradation of product quality.

Figure 7:
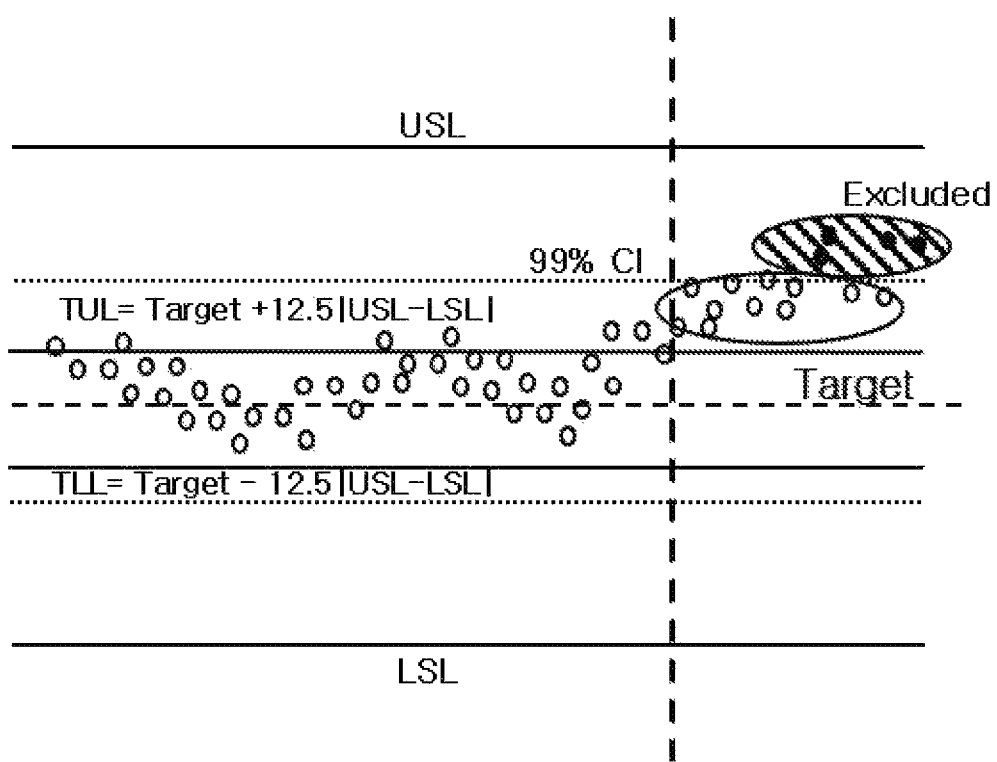
FIG. 7 is a view illustrating an example of determining a subtle change based on a correspondence between measurement data and a target value.

Accordingly, when t2 (inclusion ratio of the comparison data) is smaller than t1 (inclusion ratio of the reference data) as shown in FIG. 7, it may be determined that the subtle change corresponds to degradation of the product quality. On the other hand, when t2 is larger than t1, it may be determined that the subtle change corresponds to enhancement of the product quality.

In FIG. 7, there is comparison data classified as "exclude", expressed by dashed lines. This data corresponds to measurement data which falls out of the CI set in step S161 and is not extracted in step S162.

Thereafter, the subtle change sensing system combines the results of determining the occurrence of the subtle change in steps S140, S150, and S160, and finally determines the occurrence of the subtle change in the measurement data (S170).

Step S170 of finally determining the occurrence of the subtle change is implemented differently according to characteristics of the process/equipment. For example, different weights may be given to the results of determining according to characteristics of the process/equipment, and a final determination value may be derived. By comparing the derived final determination value and a final reference value, it is finally determined whether the subtle change occurs.

The method for sensing a subtle change in the process/equipment has been described in detail up to now with reference to preferred embodiments.

The method for sensing a subtle change in the process/equipment according to an embodiment of the present disclosure may be widely applied to manufacturing of other devices as well as semiconductors or displays.

Figure 8:
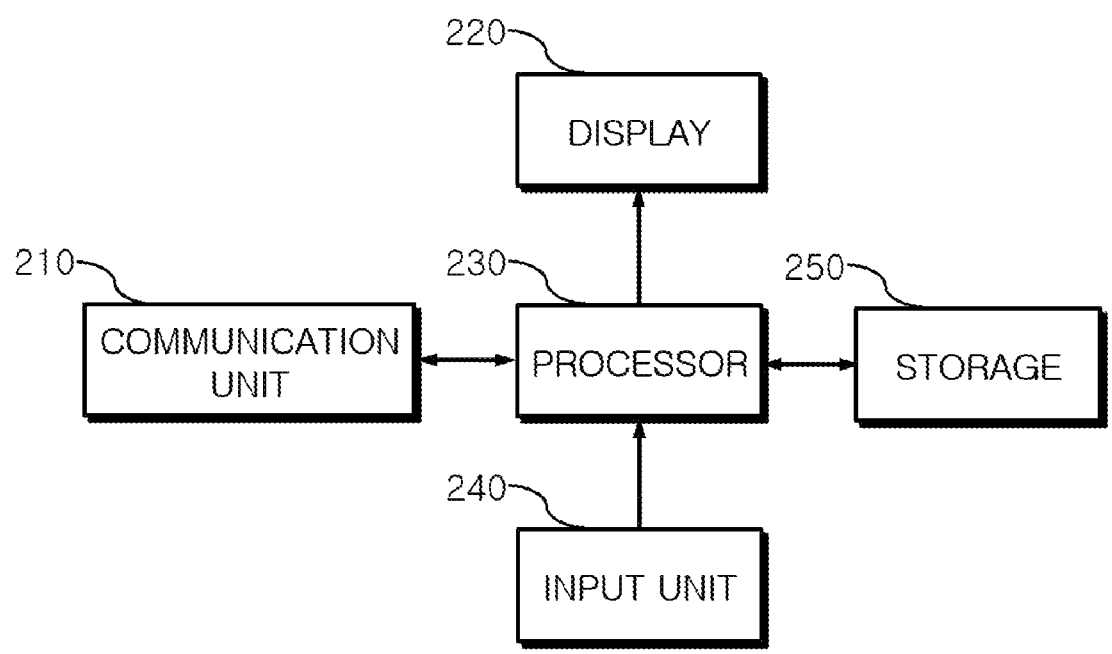
FIG. 8 is a block diagram of a system for sensing a subtle change in a process/equipment according to another embodiment of the present disclosure.

The subtle change sensing system capable of performing the method for sensing a subtle change in the process/equipment according to an embodiment of the present disclosure will be described in detail with reference to FIG. 8. FIG. 8 is a block diagram of the subtle change sensing system according to another embodiment of the present disclosure.

As shown in FIG. 8, the subtle change sensing system according to an embodiment of the present disclosure includes a communication unit 210, a display 220, a processor 230, an input unit 240, and a storage 250.

The communication unit 210 is a means for communicating data by connecting communication with an external device or an external network.

The display 220 is a means for displaying information, and the input unit 240 is a means for inputting information. The display 220 and the input unit 240 may be integrated into a touch screen, and the touch screen is more useful when the subtle change sensing system is of a mobile type.

The measurement data may be received from a measurement device/network through the communication unit 210, or may be inputted and collected through the input unit 240. Therefore, the communication unit 210 and the input unit 240 function as a data collecting means.

Furthermore, a subtle change analysis type, a target value, a USL, an LSL, etc. may be received through the communication unit 210 or may be inputted through the input unit 240.

The processor 230 performs the process/equipment subtle change sensing algorithm shown in FIG. 1, by using the received/inputted data and information, and may display a result of performing on the display 220 or may forward the result to an external device/network through the communication unit 210.

The storage 250 provides a storage space necessary for the processor 230 to perform the process/equipment subtle change sensing algorithm.

The technical idea of the present disclosure may be applied to a computer-readable recording medium which records a computer program for performing the functions of the apparatus and the method according to the present embodiment. In addition, the technical idea according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A method for sensing a change in data, the method being performed by a system for sensing a change in data regarding a process or equipment, and the method comprising:
   a step of automatically setting a type of a data change analysis among a plurality of data change analysis types according to characteristics of the process or the equipment;
   a step of extracting measurement data for the data change analysis, the measurement data including reference data and comparison data, the reference data being data accumulated for a longer time than the comparison data;
   a step of extracting a part of the reference data and the comparison data, based on statistical distributions of the reference data and the comparison data;
   a step of calculating a target range based on an upper limit and a lower limit; and
   a first determination step of identifying reference data and comparison data included in the target range from among the extracted reference data and comparison data, and determining a change in data based on the identified reference data and comparison data,
   wherein the method further comprises:
   a first test step of testing whether there is a first significant difference between a distribution of the reference data and a distribution of the comparison data, the first significant difference indicating a difference between the distribution of the reference data and the distribution of the comparison data being equal to or higher than a first predetermined value;
   a second test step of testing a change in representative values of the reference data and the comparison data;
   a second determination step of determining a change in data based on a result of the testing in the first test step and a result of the testing in the second test step; and
   a step of finally determining the change in data based on a result of the determining in the first determination step and a result of the determining in the second determination step.

2. The method of claim 1, wherein the step of calculating the target range comprises a step of calculating the target range according to following mathematical equations:

Target Range=|upper specification limit (USL)−lower specification limit (LSL)|*$w1$ TUL (target upper limit)=Target+$w2$*|USL−LSL|

TLL (target lower limit)=Target−$w2$*|USL−LSL| where Target is a target value of the specification, and $w1$ and $w2$ are weight values.

3. The method of claim 1, wherein the step of extracting the part of the reference data and the comparison data comprises a step of extracting reference data and comparison data included in a set confidence interval (CI).

4. The method of claim 1, wherein the first determination step comprises a step of, when there is a second significant difference between a first inclusion ratio of the reference data included in the target range, and a second inclusion ratio of the comparison data included in the target range, determining the change in data, the second significant difference indicating a difference between the first inclusion ratio and the second inclusion ratio being equal to or higher than a second predetermined value.

5. The method of claim 4, wherein the first determination step comprises:
   a step of, when the second inclusion ratio is smaller than the first inclusion ratio, determining that the change in data is caused by quality degradation; and
   a step of, when the second inclusion ratio is larger than the first inclusion ratio, determining that the change in data is caused by quality enhancement.

6. The method of claim 1, wherein the second test step comprises:
   a step of, when it is tested that there is the first significant difference in the distribution in the first test step, testing the change in the representative values according to a first test technique; and
   a step of, when it is tested that there is no the first significant difference in the distribution in the first test step, testing where there is a second significant difference in the representative values according to a second test technique, the second significant difference indicating a difference in the representative values being equal to or higher than a second predetermined value.

7. The method of claim 1, wherein the second determination step comprises:
   a step of, when a second absolute difference is larger than a first absolute difference, determining that the change in data is caused by quality degradation, the second absolute difference being "an absolute difference between a representative value of the comparison data and a target value of the specification", the first absolute difference being "an absolute difference between a representative value of the reference data and the target value of the specification"; and
   a step of, when the second absolute difference is smaller than the first absolute difference, determining that the change in data is caused by quality enhancement.

8. The method of claim 1, further comprising:
   a step of calculating a process ability index for each change analysis type, by using measurement data including the reference data and the comparison data; and
   a third determination step of determining the change in data, based on a size of the calculated process ability index,
   wherein the step of determining comprises a step of finally determining the change in data, based on the result of the determining in the first determination step, the result of the determining in the second determination step, and a result of the determining in the third determination step.

9. The method of claim 8, wherein the data change analysis type comprises at least one of a comparison analysis type of the reference data and the comparison data regarding the process, a comparison analysis type of the reference data and the comparison data regarding the equipment, an inter-equipment measurement data comparison analysis type, and a measurement data comparison analysis type between best performance equipment and other equipment.

10. The method of claim 8, wherein the step of calculating the process ability index comprises a step of further calculating the process ability index according to each specification type, and
wherein the specification type comprises at least one of a larger the better characteristics specification, a smaller the better characteristics specification, and a nominal the best characteristics specification.

11. The method of claim 1, wherein the reference data is measurement data of a first temporal section,
wherein the comparison data is measurement data of a second temporal section,
wherein the first temporal section precedes the second temporal section.

12. The method of claim 11, wherein the first temporal section is longer than the second temporal section.

13. The method of claim 1, wherein the reference data and the comparison data are data from which an outlier is removed,
wherein a range of the outlier varies according to a number of reference data and a number of comparison data.

14. The method of claim 13, wherein the outlier is data which is less than a lower limit (LL), or exceeds an upper limit (UL), the LL and the UL being defined by following equations:

$$LL = Q2 - K*(Q3-Q1)$$

$$UL = Q2 + K*(Q3-Q1)$$

where Q1, Q2, Q3 are data satisfying 'Q3>Q2>Q1,' $K=(a*n-b)/(c*n-d)$, a, b, c, d are constants, and n is a number of reference data and comparison data.

15. A system for sensing a change in data regarding a process or equipment, the system comprising:
a collector configured to collect reference data and comparison data; and
a processor configured:
to automatically set a type of a data change analysis among a plurality of data change analysis types according to characteristics of the process or the equipment,
to extract measurement data for the data change analysis, the measurement data including the reference data and the comparison data, the reference data being data accumulated for a longer time than the comparison data,
to extract a part of the reference data and the comparison data, based on statistical distributions of the reference data and the comparison data collected by the collector,
to calculate a target range based on an upper limit and a lower limit,
to perform a first determination of identifying reference data and comparison data included in the target range from among the extracted reference data and comparison data, and
to determine a change in data based on the identified reference data and comparison data,
wherein the processor is further configured:
to perform a first test of testing whether there is a first significant difference between a distribution of the reference data and a distribution of the comparison data, the first significant difference indicating a difference between the distribution of the reference data and the distribution of the comparison data being equal to or higher than a first predetermined value,
to perform a second test of testing a change in representative values of the reference data and the comparison data,
to perform a second determination of determining a change in data based on a result of the testing in the first test and a result of the testing in the second test, and
to finally determine the change in data based on a result of the determining in the first determination and a result of the determining in the second determination.

* * * * *